United States Patent
Yamashita et al.

(10) Patent No.: US 10,790,597 B2
(45) Date of Patent: Sep. 29, 2020

(54) TERMINAL-EQUIPPED WIRE AND WIRE HARNESS

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Takuya Yamashita, Yokkaichi (JP); Tetsuya Nakamura, Yokkaichi (JP); Yoshiaki Yamano, Yokkaichi (JP); Junichi Ono, Yokkaichi (JP); Takaaki Ito, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/366,216

(22) Filed: Mar. 27, 2019

(65) Prior Publication Data
US 2019/0305443 A1 Oct. 3, 2019

(30) Foreign Application Priority Data

Mar. 30, 2018 (JP) .................. 2018-066579

(51) Int. Cl.
*H01R 4/18* (2006.01)
*H01R 13/52* (2006.01)
*H01R 13/533* (2006.01)
*H02G 3/04* (2006.01)
*H01R 43/048* (2006.01)
*H01R 4/62* (2006.01)

(52) U.S. Cl.
CPC ............. *H01R 4/187* (2013.01); *H01R 4/185* (2013.01); *H01R 4/625* (2013.01); *H01R 13/5216* (2013.01); *H01R 13/533* (2013.01); *H01R 43/048* (2013.01); *H02G 3/04* (2013.01)

(58) Field of Classification Search
CPC .... H01R 4/185; H01R 4/625; H01R 13/5216; H01R 13/533
USPC ........................................................ 439/874
See application file for complete search history.

(56) References Cited

U.S. PATENT DOCUMENTS

| 6,613,263 | B2 * | 9/2003 | Kondo | ..................... H01R 4/70 264/263 |
| 8,771,015 | B2 * | 7/2014 | Inoue | ..................... H01R 4/70 439/604 |

(Continued)

FOREIGN PATENT DOCUMENTS

| JP | 2013-214477 A | | 10/2013 |
| JP | 2015-116681 | * | 6/2015 |
| JP | 2016-164890 A | | 9/2016 |

*Primary Examiner* — Peter G Leigh
(74) *Attorney, Agent, or Firm* — Oliff PLC

(57) ABSTRACT

A terminal-equipped wire that includes a terminal fitting; a wire including a conductor and a wire covering that covers an outer circumference of the conductor, the wire being electrically connected to the terminal fitting at an electric connection; and a resin covering that covers the electric connection and is in contact with the wire covering.

6 Claims, 2 Drawing Sheets

(56) References Cited

U.S. PATENT DOCUMENTS

| | | | | |
|---|---|---|---|---|
| 8,927,863 B2 * | 1/2015 | Tanikawa | H02G 15/04 | 174/74 A |
| 9,083,100 B2 * | 7/2015 | Uno | H01R 4/70 | |
| 9,407,051 B2 * | 8/2016 | Katou | H01R 4/70 | |
| 9,667,011 B2 * | 5/2017 | Sato | H01R 4/70 | |
| 9,882,291 B2 * | 1/2018 | Shimizu | H01R 4/185 | |
| 2001/0003688 A1 * | 6/2001 | Kondo | B29C 45/14426 | 439/604 |
| 2011/0070770 A1 * | 3/2011 | Sakai | H01R 4/70 | 439/521 |
| 2012/0199391 A1 * | 8/2012 | Inoue | H01B 7/2806 | 174/72 A |
| 2012/0205151 A1 * | 8/2012 | Inoue | C09D 5/082 | 174/72 A |
| 2012/0325552 A1 * | 12/2012 | Sakura | H01R 4/185 | 174/74 R |
| 2013/0052887 A1 * | 2/2013 | Inoue | H01R 4/70 | 439/877 |
| 2013/0056266 A1 * | 3/2013 | Inoue | C09D 5/08 | 174/72 A |
| 2013/0062114 A1 * | 3/2013 | Inoue | C09D 4/00 | 174/72 A |
| 2013/0072074 A1 * | 3/2013 | Inoue | H01R 4/70 | 439/886 |
| 2013/0098679 A1 * | 4/2013 | Takata | C08L 23/26 | 174/74 R |
| 2013/0199842 A1 * | 8/2013 | Inoue | H01R 4/62 | 174/84 C |
| 2013/0309903 A1 * | 11/2013 | Iio | H01R 13/5216 | 439/523 |
| 2015/0021090 A1 | 1/2015 | Mano et al. | | |
| 2015/0065978 A1 * | 3/2015 | Uda | A61F 13/534 | 604/370 |
| 2015/0340848 A1 * | 11/2015 | Nakashima | C08G 18/4825 | 174/72 A |
| 2016/0156113 A1 * | 6/2016 | Tanaka | H01R 4/185 | 439/604 |

* cited by examiner

TERMINAL-EQUIPPED WIRE AND WIRE HARNESS

This application claims priority from JP 2018-066579 filed Mar. 30, 2018, the entire disclosure of which is incorporated herein by reference.

BACKGROUND

The present disclosure relates to a terminal-equipped wire and a wire harness, and specifically to a terminal-equipped wire including a resin covering portion, which is for corrosion protection, at an electric connection portion where a conductor and a terminal fitting are connected to each other, and to a wire harness including the terminal-equipped wire.

Wires disposed in vehicles, such as automobiles, may include a conductor connected to a terminal fitting at an end of a wire. The conductor of the wire is electrically connected to the terminal fitting at an electric connection portion, which requires corrosion protection. The electric connection portion may include different metals that come into contact with each other, in which case, dissimilar metal corrosion may occur. A wire for use in vehicles may include a conductor made of aluminum or an aluminum alloy to reduce the weight of the vehicle. A terminal fitting may be made of copper or a copper alloy, and the surface of the material is often plated with a material such as tin. The aluminum-based metal material may thus come into contact with the copper-based metal material or the tin layer in the electric connection portion, where dissimilar metal corrosion is likely to be a problem. Reliable corrosion prevention is thus desired for the electric connection portion.

To prevent corrosion of an electric connection portion, there are well known techniques where the electric connection portion is covered with a resin material. For example, a technique is disclosed in JP 2013-214477A in which an anticorrosive material is molded integrally with the circumference of a connection portion where a conductor of a terminal-equipped wire and a crimp terminal are connected to each other. The integrated anticorrosive material also surrounds a wire covering material adjacent to the connection portion. The anticorrosive material contains a thermoplastic elastomer as the principal component and has a peel strength from the material of the terminal portion of the crimp terminal and a peel strength from the wire covering material that are greater than or equal to a predefined value.

Another technique for preventing corrosion of an electric connection portion is disclosed in JP 2016-164890A in which a water stopping material is provided on a crimp terminal at a predetermined position on an inner surface of the crimp portion that is crimped to the bare wire conductor. When the crimp terminal is connected to the aluminum core of the wire, a gap between the crimp portion and the aluminum core is sealed by the water stopping material provided on the inner surface of the crimp portion.

SUMMARY

Polyvinyl chloride (PVC) is generally used as a wire covering material for covering the conductor of a wire. A plasticizer is often added to the PVC material to enhance flexibility. A terminal-equipped wire may be provided with a resin covering portion made of an anticorrosive material at the electric connection portion as described in JP 2013-214477A. The terminal-equipped wire may be disposed in the engine compartment or the like of an automobile. When the terminal-equipped wire is in a high-temperature environment, the plasticizer in the wire covering material is likely to migrate to the resin covering portion at a contact portion where the resin covering portion is in contact with the wire covering material. In particular, the plasticizer is likely to migrate if the resin covering portion is made of a resin material with low crystallinity such as a thermoplastic elastomer.

If a plasticizer migrates from a wire covering material to a resin covering portion, which increases the modulus of elasticity of the wire covering material, a crack is likely to form in the wire covering material. A crack that has formed may form an entry path for a corrosion factor, such as moisture, allowing the corrosion factor to reach and corrode the electric connection portion surrounded by the resin covering portion. The long-term anticorrosion performance of the terminal-equipped wire may thus be compromised.

A layer of an anticorrosive material may be provided on the inner surface of the crimp portion of a terminal fitting, as described in JP 2016-164890A, to seal the wire conductor. This structure does not allow the wire covering material to directly come into contact with the anticorrosive material, thus substantially preventing the migration of the plasticizer from the wire covering material to the anticorrosive material. However, terminal fittings having such unique structures where the anticorrosive material is provided on the inner surface of the crimp portion cannot be designed in the same way as conventional, general terminal fittings that have no anticorrosive material on the inner surface of the crimp portion, and thus the versatility of the terminal fittings is reduced and the economical efficiency of manufacturing the terminal fittings decreases.

An exemplary aspect of the disclosure provides a terminal-equipped wire and a wire harness, the terminal-equipped wire including an electric connection portion where a terminal fitting and a wire are connected and being covered by a resin covering portion, and the formation of a crack in a wire covering material due to migration of a plasticizer from the wire covering material to the resin covering portion can be inhibited without employing a special structure.

According to an aspect of the present disclosure, the terminal-equipped wire includes: a terminal fitting; a wire including a conductor and a wire covering that covers an outer circumference of the conductor, the wire being electrically connected to the terminal fitting at an electric connection; and a resin covering that covers the electric connection and is in contact with the wire covering. The wire covering contains polyvinyl chloride and a plasticizer, the polyvinyl chloride being a principal component of the wire covering and having a degree of polymerization smaller than or equal to 3000, the resin covering contains a high-molecular-weight component and a plasticizer, and a plasticizer ratio defined as b/a in which a content of the plasticizer of the wire covering is defined as "a" parts by mass per 100 parts by mass of the high-molecular-weight component of the wire covering, and a content of the plasticizer of the resin covering is defined as "b" parts by mass per 100 parts by mass of the high-molecular-weight component of the resin covering, is greater than or equal to 0.1.

According to another aspect, the resin covering may contain a thermoplastic elastomer as the high-molecular-weight component. According to still another aspect, the plasticizer ratio may be greater than or equal to 0.25. According to yet another aspect, the degree of polymerization of the polyvinyl chloride may be equal to or smaller than 2000. According to yet another aspect, fusion bonding may occur at an interface between the wire covering and the resin covering.

A wire harness according to the present disclosure includes the terminal-equipped wire according to any one of the aspects described above.

In the terminal-equipped wire according to the present disclosure, the resin covering contains a plasticizer, and the plasticizer ratio, which is a ratio of the plasticizer content of the resin covering to the plasticizer content of the wire covering, is greater than or equal to 0.1. The plasticizer in the wire covering is thus not likely to migrate to the resin covering in a high-temperature environment. Additionally, the degree of polymerization of the polyvinyl chloride in the wire covering is smaller than or equal to 3000. The wire covering can thus maintain enhanced flexibility even if the plasticizer migrates from the wire covering to the resin covering in a high-temperature environment, and thus the plasticizer content of the wire covering is reduced. As described above, the migration of the plasticizer is inhibited and, even if migration does occur, the effect of the migration is curbed. Thus, the formation of a crack in the wire covering due to the migration of the plasticizer from the wire covering to the resin covering can be inhibited. The anticorrosion performance of the terminal-equipped wire that is provided by the resin covering can thus be maintained for a long time.

When the resin covering contains a thermoplastic elastomer as the high-molecular-weight component, the resin covering has enhanced anticorrosion performance due to the properties of the thermoplastic elastomer. While thermoplastic elastomers tend to initiate migration of a plasticizer from a material that is in contact therewith due to low crystallinity, specifying the plasticizer ratio and the degree of polymerization of polyvinyl chloride in the wire covering as described above can effectively inhibit the formation of a crack in the wire covering due to the migration of the plasticizer.

When the plasticizer ratio is greater than or equal to 0.25, the migration of the plasticizer from the wire covering to the resin covering can be inhibited particularly effectively.

When the degree of polymerization of the polyvinyl chloride is smaller than or equal to 2000, the polyvinyl chloride has enhanced flexibility, which can inhibit the formation of a crack in the wire covering particularly effectively even if the plasticizer migrates and the plasticizer content of the wire covering is reduced.

When fusion bonding occurs at the interface between the wire covering and the resin covering, the fusion bonding causes the resin covering to firmly adhere to the wire covering, providing enhanced anticorrosion performance. While the fusion bonding makes the plasticizer more likely to migrate from the wire covering to the resin covering, specifying the plasticizer ratio and the degree of polymerization of polyvinyl chloride in the wire covering as described above can effectively inhibit the formation of a crack in the wire covering due to the migration of the plasticizer.

The wire harness according to the disclosure includes a terminal-equipped wire as described above and thus a crack that may form in the wire covering due to the migration of the plasticizer from the wire covering to the resin covering under a high-temperature environment is unlikely to form. Accordingly, the anticorrosion performance can be easily maintained for a long time.

DETAILED DESCRIPTION OF EMBODIMENTS

Some embodiments of the present disclosure are described below in detail with reference to the drawings.

Terminal-Equipped Wire

Overall Structure

Figure 1:
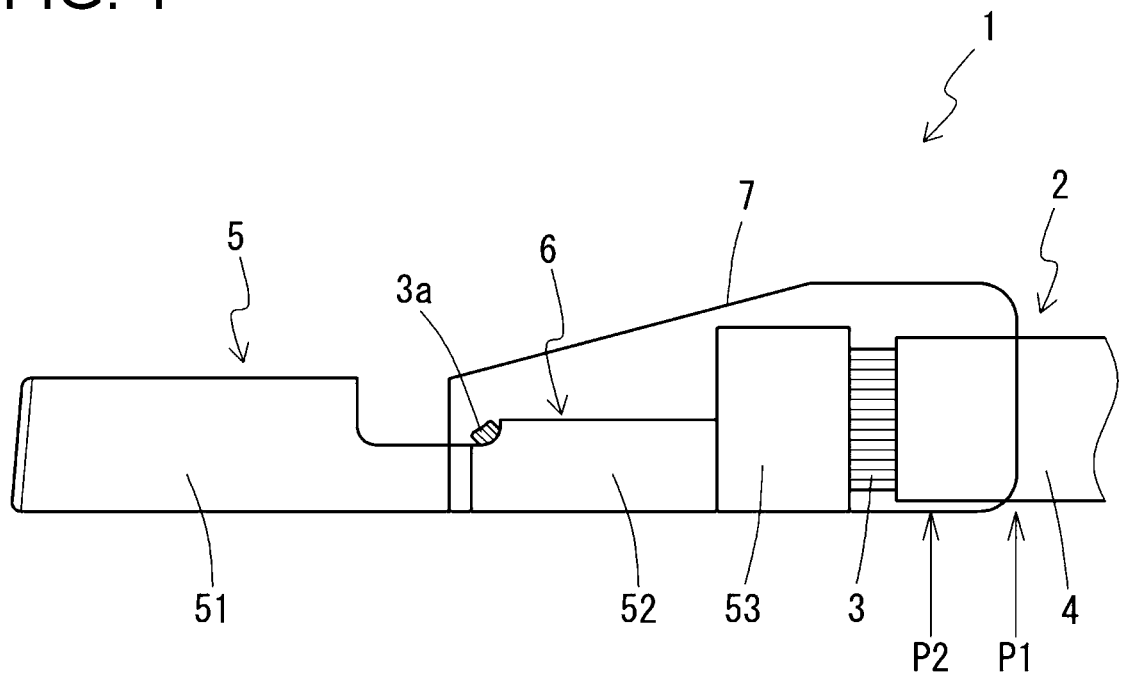
FIG. 1 is a see-through side view showing a terminal-equipped wire according to an embodiment of the present disclosure.
Figure 2:
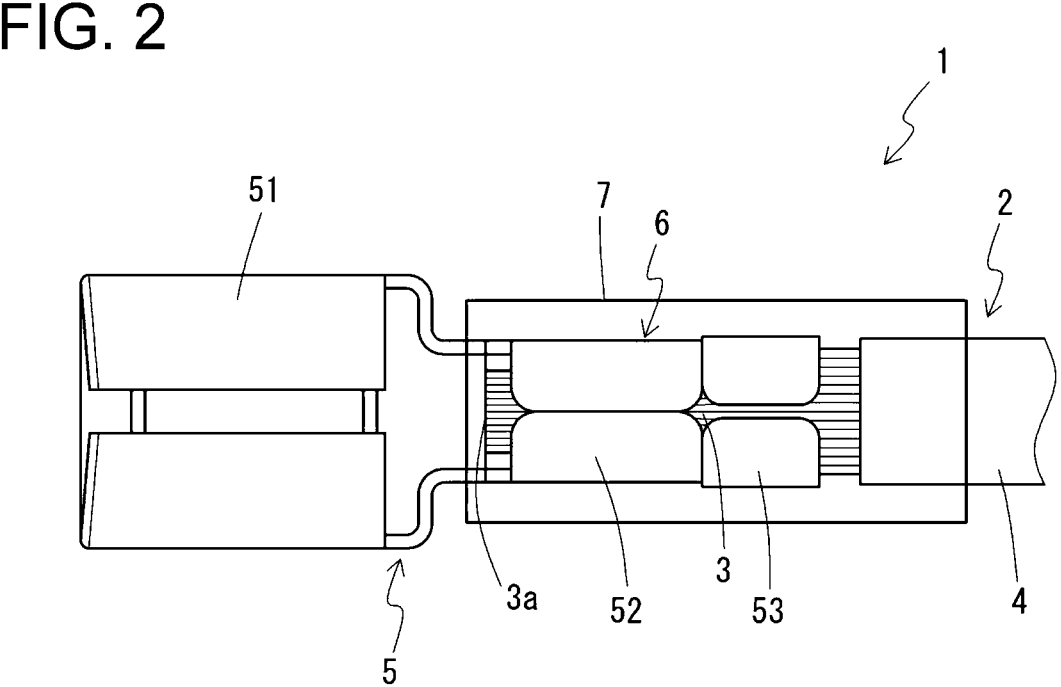
FIG. 2 is a see-through plan view showing the terminal-equipped wire.

An overall structure of a terminal-equipped wire 1 according to an embodiment of the present disclosure is described below with reference to FIGS. 1 and 2. The terminal-equipped wire 1 according to an embodiment of the present disclosure includes a wire 2, which includes a conductor 3 and a wire covering material 4 (wire covering) that is an insulator and covers the conductor 3, and a terminal fitting 5 electrically connected to the wire 2 at an electric connection portion 6 (electric connection). A portion including the electric connection portion 6 is covered by a resin covering portion 7 made of a resin material. As used herein, the terminal fitting 5 is disposed on a forward side (to the left in FIG. 1) of the terminal-equipped wire 1 placed along a longitudinal direction, and the wire 2 is disposed on a rearward side (to the right in FIG. 1) of the terminal-equipped wire 1.

The terminal fitting 5 includes a connection portion 51. The terminal fitting 5 also includes a barrel portion that includes a first barrel portion 52 and a second barrel portion 53, and is formed integrally with and extending from a rear end side of the connection portion 51. The connection portion 51 may be a box-like fitting connection portion of a female fitting terminal and may be fittable to a male connection terminal (not shown).

The wire covering material 4 is stripped from an end portion of the wire 2 to expose the conductor 3 at the electric connection portion 6. The end portion of the wire 2 where the conductor 3 is exposed is crimped and fixed to the barrel portions 52 and 53 of the terminal fitting 5 on one side thereof (the upper side in FIG. 1) to connect the wire 2 and the terminal fitting 5 to each other. Specifically, the first barrel portion 52 electrically connects the conductor 3 to the terminal fitting 5 and physically fixes the conductor 3 to the terminal fitting 5. The second barrel portion 53 fixes the wire 2 at a position rearward of the first barrel portion 52 with a force smaller than that with which the first barrel portion 52 fixes the conductor 3, physically fixing the wire 2 to the terminal fitting 5 in a supplementary manner. The second barrel portion 53 may be crimped to the conductor 3 exposed at the end portion of the wire 2 at a rearward position or crimped to the outer circumference of the wire covering material 4 at a farther rearward position where the conductor 3 is covered by the wire covering material 4. In the illustrated example, the second barrel portion 53 is crimped and fixed to the exposed conductor 3.

The resin covering portion 7 spans a region from a position forward of an end 3a of the conductor 3 exposed at the end portion of the wire 2 to a position rearward of an end of the wire covering material 4, and covers the entire electric connection portion 6 and an end portion of the wire covering material 4 in the longitudinal direction of the terminal-equipped wire 1. The resin covering portion 7 covers all faces of the terminal-equipped wire 1 in a circumferential direction of the terminal-equipped wire 1 at the position of the terminal fitting 5 except the bottom face of the terminal fitting 5 (opposite to the side on which the conductor 3 is fixed in a lower portion of FIG. 1). The resin covering portion 7 covers the enter circumference of the wire 2 at the position of the wire 2. The resin covering portion 7 is in contact with the surface of the wire covering material 4 a portion where it covers the wire covering material 4.

The terminal-equipped wire 1 can be used as a connector when a portion of the terminal fitting 5 including the electric connection portion 6 is inserted into a hollow connector housing (not shown) made of a resin material such as polybutylene terephthalate (PBT). When the resin covering portion 7 is not provided on the bottom face of the terminal fitting 5 as described above, the terminal-equipped wire 1 can be inserted into the hollow portion of a small connector housing with ease. The resin covering portion 7, however, may be provided on the underside of the terminal fitting 5 when, for example, there is more room available in the hollow portion.

In the terminal-equipped wire 1 according to the present embodiment, the ratio between a plasticizer content of the wire covering material 4 and a plasticizer content of the resin covering portion 7 is greater than or equal to a predefined lower limit value as described below in detail. Additionally, the degree of polymerization of polyvinyl chloride (PVC) included in the wire covering material 4 is smaller than or equal to a predefined upper limit value. Employing the effects of the above can inhibit the formation of a crack in the wire covering material 4 due to the migration of a plasticizer from the wire covering material 4 to the resin covering portion 7.

Structure of Constituent Elements

Structures of the constituent elements of the terminal-equipped wire 1, namely, the terminal fitting 5, the conductor 3 and the wire covering material 4 of the wire 2, and the resin covering portion 7, are described in detail below.

(1) Terminal fitting Examples of the material (the base material) of the terminal fitting 5 include brass, which is commonly used, copper alloys, and copper. A portion of the surface of the terminal fitting 5 (a contact point, for instance) or the entire surface of the terminal fitting 5 may be plated using a metal such as tin, nickel, gold, or an alloy including any of these materials.

(2) Conductor

The conductor 3 of the wire 2 may be a single metal strand or, more preferably, may be a stranded conductor made by twisting together a plurality of strands. The stranded conductor may be configured using one type of metal strand or two or more different types of metal strand. The stranded conductor may also include a strand made of a material such as an organic fiber, in addition to the metal strands. The stranded conductor may also include other materials such as a reinforcement wire (tension member) for the reinforcement of the wire 2.

Examples of the material for the metal strand included in the conductor 3 include copper, a copper alloy, aluminum, an aluminum alloy, or any of these materials provided with various types of plating. Examples of the material for the metal strand used as a reinforcement wire include a copper alloy, titanium, tungsten, and stainless steel. Examples of the material for an organic fiber used as the reinforcement wire include Kevlar.

While the conductor 3 and the terminal fitting 5 may be made of various materials as described above, dissimilar metals that are in contact with each other in the electric connection portion 6 tend to cause corrosion particularly in the electric connection portion 6, when a corrosion factor, such as moisture, comes into contact with the electric connection portion 6. Dissimilar metals are placed in contact with each other when, for example, the terminal fitting 5 is made using a common terminal material, such as copper or a copper alloy, as the base material and tin for plating, and the conductor 3 is made using strands of aluminum or an aluminum alloy. Note, however, that the resin covering portion 7 covers the electric connection portion 6 and thus can inhibit dissimilar metal corrosion.

(3) Wire Covering Material

The wire covering material 4 included in the wire 2 contains, as the principal component, polyvinyl chloride (PVC) having a degree of polymerization smaller than or equal to 3000. In other words, PVC having a degree of polymerization smaller than or equal to 3000 constitutes the largest proportion of the entire high-molecular-weight component of the wire covering material 4. When the degree of polymerization of the PVC is lower, the wire covering material 4 has greater flexibility. PVC having a degree of polymerization smaller than or equal to 3000 preferably constitutes 50% by mass or greater of the high-molecular-weight component of the wire covering material 4, and more preferably, constitutes the entire high-molecular-weight component of the wire covering material 4. The degree of polymerization of PVC that is the principal component of the wire covering material 4 is more preferably smaller than or equal to 2500, or is even more preferably smaller than or equal to 2000. While a specific lower limit value is not specified, the degree of polymerization of PVC that is the principal component of the wire covering material 4 is preferably greater than or equal to 1000 from the viewpoint of ensuring sufficient tensile rupture strength of the wire covering material 4.

The wire covering material 4 may contain another high-molecular-weight ingredient as long as its principal component is PVC with a degree of polymerization smaller than or equal to 3000. Other high-molecular-weight ingredients include PVC having a degree of polymerization exceeding 3000 or different types of high-molecular-weight materials other than PVC, such as rubber, polyolefins such as polypropylene (PP), and thermoplastic elastomers.

The wire covering material 4 contains a plasticizer in addition to the high-molecular-weight component. The type of plasticizer is not particularly limited, and a plasticizer commonly added for the purpose of imparting flexibility to PVC may be used. Examples of such plasticizers include: phthalate ester-based plasticizers such as diisononyl phthalate (DINP) and dioctyl phthalate (DOP); trimellitate-based plasticizers such as tris(2-ethylhexyl) trimellitate (TOTM); and polyester-based plasticizers. Low-molecular-weight plasticizers, such as phthalate ester-based plasticizers and trimellitate-based plasticizers, are more likely than high-molecular-weight (polymeric) plasticizers to migrate to a material in contact therewith; thus, low-molecular-weight plasticizers may enhance the effect of inhibiting the formation of a crack in the wire covering material 4 due to the migration of the plasticizer when the degree of polymerization of PVC and a plasticizer ratio, to be described below, are specified. In particular, DINP is the plasticizer most commonly added to wire covering materials that contain PVC as the principal component. DINP is also preferably used in the present embodiment. One type of plasticizer may be used; or alternatively, two or more types of plasticizer may be used.

The plasticizer content of the wire covering material 4 is not particularly limited as long as it satisfies the plasticizer ratio, to be described below, with respect to the plasticizer content of the resin covering portion 7. Nonetheless, the plasticizer content of the wire covering material 4 is preferably more than or equal to 10 parts by mass, or more preferably more than or equal to 40 parts by mass, per 100 parts by mass of the high-molecular-weight component, from the viewpoint of imparting sufficient flexibility to the wire covering material 4 and the viewpoint of retaining a large amount of the plasticizer even if the plasticizer migrates or volatilizes. The plasticizer content of the wire covering material 4 is preferably equal to or less than 70 parts by mass from the viewpoint of preventing the plasticizer from seeping out of the wire covering material 4 while the wire 2 is in storage.

In addition to the plasticizer, an additive may be added to the material of the wire covering material 4 as appropriate. Examples of the additive include a flame retardant, a filler, a colorant, and a stabilizer.

(4) Resin Covering Portion

As described above, the resin covering portion 7 continuously covers a region of the terminal-equipped wire 1 that includes the electric connection portion 6 and extends from a position forward of the end 3a of the conductor 3 to a portion of the conductor 3 that is covered by the wire covering material 4. The resin covering portion 7 covering the electric connection portion 6 is capable of inhibiting the entry of a corrosion factor, such as moisture, into the electric connection portion 6. The resin covering portion 7 thus serves to inhibit corrosion of the electric connection portion 6 caused by a corrosion factor.

The resin covering portion 7 contains a high-molecular-weight component and a plasticizer. The types of high-molecular-weight component and plasticizer are not particularly limited. Since the resin covering portion 7 contains a plasticizer, the migration of a plasticizer from the wire covering material 4 to the resin covering portion 7 can be inhibited.

While the type of plasticizer in the resin covering portion 7 is not particularly limited as described above, plasticizers based on the same group of compounds as those in the wire covering material 4 are preferably used from the viewpoint of effectively inhibiting the migration of the plasticizer from the wire covering material 4 due to the addition of a plasticizer in the resin covering portion 7. If, for example, the plasticizer in the wire covering material 4 is phthalate ester-based, the plasticizer in the resin covering portion 7 is also preferably phthalate ester-based. It is particularly preferable if the type of plasticizer in the wire covering material 4 is the same as that in the resin covering portion 7. One type of plasticizer may be used in the resin covering portion 7; or alternatively, two or more types of plasticizer may be used, as in the case with the wire covering material 4.

The plasticizer content of the resin covering portion 7 is determined based on the ratio to the plasticizer content of the wire covering material 4. The plasticizer content of the wire covering material 4 is defined as "a" parts by mass per 100 parts by mass of the high-molecular-weight component of the wire covering material 4. The plasticizer content of the resin covering portion 7 is defined as "b" parts by mass per 100 parts by mass of the high-molecular-weight component of the resin covering portion 7. The plasticizer ratio, which is the ratio of the plasticizer content of the resin covering portion 7 to the plasticizer content of the wire covering material 4, is b/a. The plasticizer content of the resin covering portion 7 is determined so that the plasticizer ratio is greater than or equal to 0.1.

When the plasticizer ratio is greater than or equal to 0.1, the migration of the plasticizer from the wire covering material 4 to the resin covering portion 7 can be inhibited effectively. The plasticizer ratio is more preferably greater than or equal to 0.25 or, even more preferably, greater than or equal to 0.5. When two or more different types of plasticizer are added to the wire covering material 4 and/or the resin covering portion 7, the plasticizer ratio may be specified based on the total content of the plasticizers.

As described above, the type of high-molecular-weight component of the resin covering portion 7 is not particularly limited. One type of high-molecular-weight component may be used in the resin covering portion 7; or alternatively, two or more types of high-molecular-weight component may be used. Examples of the high-molecular-weight component include polyester resins, polystyrenic resins, polycarbonate resins, polyolefinic resins, acrylate resins, polyamide resins, thermoplastic elastomers, and rubber. Of the examples set forth, polystyrenic resins, acrylate resins, polyamide resins, thermoplastic elastomers, and rubber are preferably used because they allow smooth migration of a plasticizer from a material in contact therewith, and the effect of these materials inhibiting the migration of the plasticizer from the wire covering material 4 can be increased by specifying the plasticizer ratio.

The high-molecular-weight component of the resin covering portion 7 preferably has a high tensile modulus, high tensile elongation, and high tension strength from the viewpoint of achieving enhanced anticorrosion performance. For instance, the tensile modulus is preferably greater than or equal to 15 MPa or, more preferably, greater than or equal to 30 MPa; the tensile elongation is preferably greater than or equal to 100%; and the tension strength is preferably greater than or equal to 5 MPa or, more preferably, greater than or equal to 10 MPa. When the high-molecular-weight component of the resin covering portion 7 has the properties described above, a resin covering portion 7 can be formed that can exhibit excellent adhesion to surfaces of the electric connection portion 6 and the wire covering material 4, and is unlikely to damaged such as a crack forming during use. The properties described above are measured at room temperature in accordance with JIS K 7161. The melting point of the high-molecular-weight component is preferably greater than or equal to 160° C. or, more preferably, greater than or equal to 180° C. as measured in accordance with JIS K 7121 from the viewpoint of heat resistance. The melt viscosity of the high-molecular-weight component is preferably smaller than or equal to 900 dPa·s or, more preferably, smaller than or equal to 500 dPa·s as measured at 250° C. in accordance with JIS K 7210 from the viewpoint of spreadability when forming the resin covering portion 7. Of the examples set forth above, in particular, a thermoplastic elastomer can be preferably used because it tends to satisfy the properties described above and exhibits high adhesiveness to both of the surfaces of the terminal fitting 5 and the wire covering material 4. Examples of thermoplastic elastomers include polyester-based elastomers, polyurethane-based elastomers, and polyamide-based elastomers. Of the examples set forth, use of polyester-based elastomers, which is particularly good in terms of the properties described above and adhesiveness, is particularly preferable.

The resin covering portion 7 may contain an additive in addition to the plasticizer. Examples of the additive include a flame retardant, a filler, a colorant, and a stabilizer.

While the thickness of the resin covering portion 7 is not particularly limited, it is preferably greater than or equal to 0.1 mm from the viewpoint of securing sufficient anticorrosion properties. The thickness is preferably smaller than or equal to 0.2 mm from the viewpoint of avoiding an increase in the size of the resin covering portion 7.

Fusion bonding (welding) preferably occurs at a contact portion where the resin covering portion 7 is in contact with the wire covering material 4. Fusion bonding causes the resin covering portion 7 to firmly adhere to the wire covering material 4, thus providing improved anticorrosion performance. Fusion bonding is a state in which the high-molecular-weight materials in the resin covering portion 7 and the wire covering material 4 melt, interdiffuse, and solidify at the interface between the resin covering portion 7 and the wire covering material 4, and at the interface, a fusion bonding layer (bonding layer) is formed in which the high-molecular-weight materials of the resin covering portion 7 and the wire covering material 4 are mixed or chemically reacted with each other. The fusion bonding layer can be formed by, for example, bringing a composite forming the resin covering portion 7 heated to a temperature equal to or higher than the melting point of the wire covering material 4 into contact with the surface of the wire covering material 4 when forming the resin covering portion 7 using a technique such as injection molding.

The shape of the resin covering portion 7 is not limited to the description provided above and may take any shape or cover any portion provided that it covers the electric connection portion 6 and is in contact with the wire covering material 4. For example, a layer made of a different resin material may be provided over the resin covering portion 7 to protect the resin covering portion 7 and for other purposes. Additionally, from the viewpoint of assisting adhesion of the resin covering portion 7 to the surface of the terminal fitting 5, a primer (adhesive agent) layer may be provided between the resin covering portion 7 layer and a surface of the terminal fitting 5 at a position where the resin covering portion 7 covers the terminal fitting 5. When a thermoplastic elastomer, which is described above as a preferable material for the resin covering portion 7, is used as the high-molecular-weight component of the resin covering portion 7, there may be no need to use a primer because thermoplastic elastomers often exhibit high adhesive strength to metal materials.

To assemble the terminal-equipped wire 1, the barrel portions 52 and 53 of the terminal fitting 5 may be crimped and fixed to to the end portion of the wire 2 from which the wire covering material 4 has been stripped. The resin covering portion 7 may then be formed through, for example, injection molding or coating on a predefined region including the electric connection portion 6 at which the wire conductor 3 and the terminal fitting 5 are crimped together.

Migration of Plasticizer

As described above, the plasticizer ratio, which is the ratio of the plasticizer content of the resin covering portion 7 to that of the wire covering material 4, is greater than or equal to 0.1 in the terminal-equipped wire 1 according to the present embodiment. Additionally, the degree of polymerization of the PVC in the wire covering material 4 is smaller than or equal to 3000. These features can together inhibit the formation of a crack in the wire covering material 4 due to the migration of the plasticizer from the wire covering material 4 to the resin covering portion 7 through the interface between the wire covering material 4 and the resin covering portion 7 when the terminal-equipped wire 1 is exposed to high temperatures.

If the resin covering portion 7 does not contain a plasticizer or if the plasticizer content of the resin covering portion 7 is not sufficient to satisfy the plasticizer ratio, the plasticizer in the wire covering material 4 diffuses and migrates to the resin covering portion 7 through their contact interface when a portion in which the wire covering material 4 is in contact with the resin covering portion 7 is exposed to high temperatures. The migration of the plasticizer leads to a reduction in the plasticizer content of the wire covering material 4, thus impairing the effect of the plasticizer to soften the wire covering material 4. The modulus of elasticity of the wire covering material 4 thus increases, making the wire covering material 4 brittle. A crack is then likely to form in or near a portion of the wire covering material 4 that is in contact with the resin covering portion 7. A crack in the wire covering material 4 forms an entry path for a corrosion factor. The corrosion factor may enter the electric connection portion 6, which is covered by the resin covering portion 7, through the entry path, potentially causing corrosion of the electric connection portion 6.

In contrast, when the resin covering portion 7 contains a plasticizer so that the plasticizer ratio is greater than or equal to 0.1 or, more preferably, greater than or equal to 0.25 or greater than or equal to 0.5 and the difference in plasticizer content between the wire covering material 4 and the resin covering portion 7 is reduced, the plasticizer in the wire covering material 4 is not likely to diffuse to the resin covering portion 7 when the resin covering portion 7 and the wire covering material 4 are exposed to high temperatures. Since the migration of the plasticizer is inhibited as described above, the wire covering material 4 can maintain its flexibility in a high-temperature environment, and the formation of a crack in the wire covering material 4 due to a reduction in the flexibility of the wire covering material 4 can be inhibited. Thus, the anticorrosion performance of the resin covering portion 7 can be maintained for a long time.

In the terminal-equipped wire 1 according to the present embodiment, a plasticizer added to the PVC of the wire covering material 4 for improved flexibility may migrate to the resin covering portion 7 under high temperatures, which reduces the plasticizer content of the wire covering material 4. A crack is then likely to form in the wire covering material 4 if the PVC itself does not have sufficient flexibility. The plasticizer content of the wire covering material 4 may be reduced not only due to the migration of the plasticizer to the resin covering portion 7 but also the volatilization of the plasticizer into the atmosphere.

However, PVC and other resin materials have greater flexibility the lower their degree of polymerization is. The degree of polymerization of the PVC in the wire covering material 4 is smaller than or equal to 3000 or, more preferably, smaller than or equal to 2500 or smaller than or equal to 2000. The PVC itself remains highly flexible in this way. Thus, even if the plasticizer content of the wire covering material 4 is reduced due to migration or volatilization of the plasticizer in a high-temperature environment, enhanced flexibility can be ensured for the entire wire covering material 4. A crack is thus inhibited from forming in or near a portion of the wire covering material 4 that is in contact with the resin covering portion 7. Accordingly, a reduction in the anticorrosion performance can be inhibited.

As described above, an amount of plasticizer sufficient to satisfy the plasticizer ratio is added to the resin covering portion 7 of the terminal-equipped wire 1 according to the present embodiment, and thus the migration of a plasticizer from the wire covering material 4 to the resin covering portion 7 is inhibited. Additionally, the degree of polymerization of the PVC in the wire covering material 4 is low as described above, and thus, even if there is migration of the plasticizer to the resin covering portion 7, the effect of the migration, that is, a reduction in the flexibility of the wire covering material 4, can be curbed. The two mechanisms described above together can effectively inhibit a phenomenon where a crack forms in the wire covering material 4 due to the migration of the plasticizer from the wire covering material 4 to the resin covering portion 7 when a contact portion where the resin covering portion 7 is in contact with the wire covering material 4 is exposed to high temperatures, and the crack forms an entry path for a corrosion factor. Therefore, the anticorrosion performance of the resin covering portion 7, which prevents corrosion of the electric connection portion 6, can be maintained for a long time in the terminal-equipped wire 1, which may be used in a high-temperature environment, such as an engine compartment of an automobile.

When fusion bonding occurs at the interface between the wire covering material 4 and the resin covering portion 7, thereby causing the wire covering material 4 and the resin covering portion 7 to firmly adhere to each other, the migration of a plasticizer is more likely to occur than when no fusion bonding occurs. In such cases, the formation of a crack in the wire covering material 4 due to migration of the plasticizer through the fusion-bonded interface can be effectively inhibited by adding a sufficient amount of plasticizer to the resin covering portion 7 and by using PVC having a low degree of polymerization for the wire covering material 4 as described above. The enhanced adhesive strength, provided by the fusion bonding, between the resin covering portion 7 and the wire covering material 4 and the effective inhibition of a crack forming in the wire covering material 4 contribute to excellent anticorrosion performance.

It is the composition of the resin covering portion 7 and the wire covering material 4 that inhibits the formation of a crack in the wire covering material 4 due to the migration of a plasticizer as described above, and no special structure is required.

Wire Harness

A wire harness according to an embodiment of the present disclosure includes a plurality of wires including the terminal-equipped wire 1 according to the embodiment described above. All of the wires included in the wire harness may be the terminal-equipped wires 1 according to the embodiment described above; alternatively, some of the wires included in the wire harness may be the terminal-equipped wires 1 according to the embodiment described above.

Figure 3:
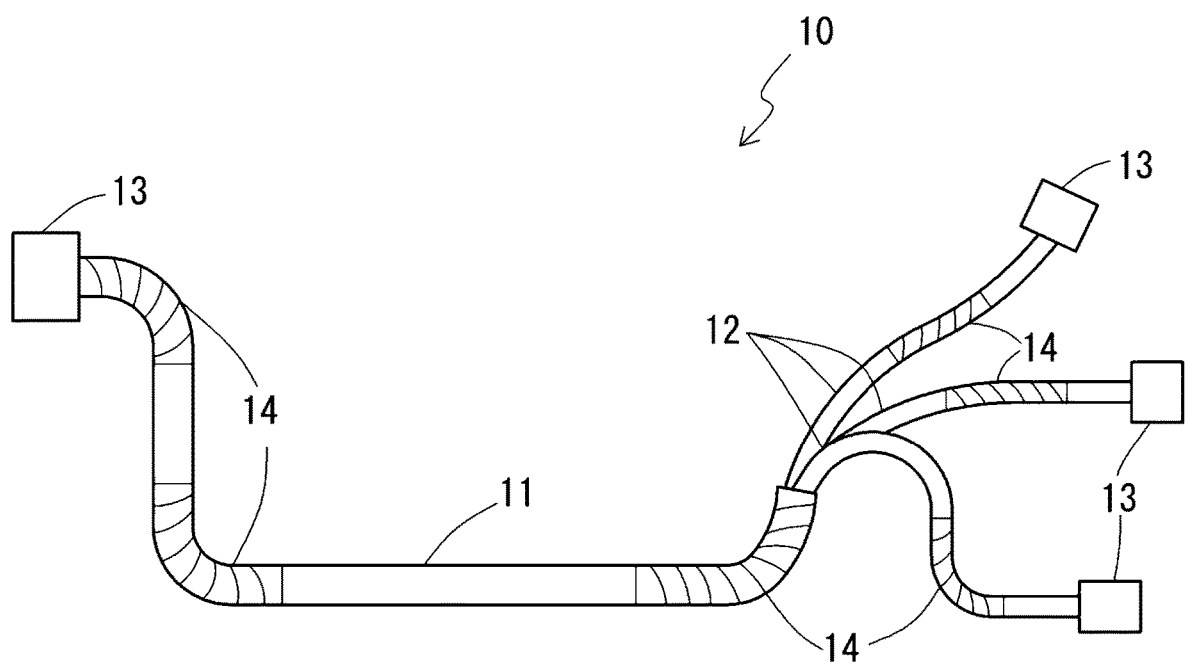
FIG. 3 is a side view showing a wire harness according to an embodiment of the present disclosure.

FIG. 3 is a diagram showing an example of the wire harness. A wire harness 10 includes a main harness portion 11 and three branch harness portions 12 extending from a distal end portion of the main harness portion 11. Terminal-equipped wires are bundled together at the main harness portion 11. The terminal-equipped wires are divided into three groups, which are respectively bundled at the branch harness portions 12. The terminal-equipped wires are bundled and bent at the main harness portion 11 and the branch harness portions 12 using adhesive tape 14. A proximal end portion of the main harness portion 11 and distal end portions of the branch harness portions 12 are each provided with a connector 13. The connectors 13 house terminal fittings attached to the end portions of the terminal-equipped wires.

At least one of the terminal-equipped wires included in the wire harness 10 is the terminal-equipped wire 1 according to one or more embodiments described above. The terminal fitting 5 and the electric connection portion 6 covered by the resin covering portion 7 of the terminal-equipped wire 1 are housed in the connector 13.

Examples

Some examples of the present disclosure and comparative examples are presented below. A relationship between the plasticizer ratio, degree of polymerization of PVC, and anticorrosion performance of the terminal-equipped wires is evaluated below. The present disclosure is not limited to the examples described below.

Preparation of Samples

The wires were prepared in a manner described below for the evaluation of the anticorrosion performance of the terminal-equipped wires. A composite for the wire covering material was prepared by mixing diisononyl phthalate (DINP) as a plasticizer, calcium bicarbonate as a filler, and a calcium zinc stabilizer into PVC. The degree of polymerization for the PVC is as indicated in Tables 1 and 2 for the examples and the comparative examples. The plasticizer content is as indicated in Tables 1 and 2 per 100 parts by mass of the PVC. The calcium bicarbonate content is 20 parts by mass per 100 parts by mass of the PVC. The stabilizer content is 5 parts by mass per 100 parts by mass of the PVC.

The ingredients described above were mixed together at a temperature of 180° C. to obtain the composite for the wire covering material. A resultant polyvinyl chloride composite was then extruded at a thickness of 0.28 mm to cover an aluminum-alloy stranded conductor having a cross sectional area of 0.75 mm and including seven aluminum alloy strands. This procedure was repeated to prepare the wires.

An end portion of the wire prepared as described above was stripped to expose the wire conductor. A female crimp terminal fitting made of brass with tin plating, a type that is widely used for automobiles, was crimped onto the end portion of each wire.

The terminal-equipped wires were then prepared using the wires in a manner described below. An anticorrosive composite for the resin covering portion was prepared by mixing DINP as a plasticizer into a polyester-based thermoplastic elastomer. The plasticizer content is as indicated in Tables 1 and 2. The polyester-based thermoplastic elastomer used is VYLOSHOT GM960-RK30, manufactured by Toyobo, which has a tensile modulus of 19 MPa, a tensile elongation of 400%, a tension strength of 4 MPa, a melting point of 160° C., and a melt viscosity of 140 dPa·s at 220° C.

A resultant anticorrosive composite was injection molded into a layer on a region of the wire with the terminal fitting crimped as described above, to obtain a resin covering portion. The resin covering portion extended from a position forward of the exposed end of the wire conductor to a portion covered by the wire covering material, as illustrated in FIGS. 1 and 2. The thickness of the resin covering portion was 0.2 mm to 0.5 mm depending on the location.

Testing Method

The terminal-equipped wires of the examples and comparative examples manufactured in the manner described above were tested for anticorrosion performance after they were exposed to a high temperature.

The terminal-equipped wire was left to stand in an atmosphere at 120° C. for three lengths of time; i.e., 30 hours, 60 hours, and 120 hours. After each length of time had passed, the terminal-equipped wire was allowed to cool to room temperature. Then, a portion of the terminal-equipped wire where the resin covering portion was disposed was fully submerged in water. An air pressure of 50 kPa was then applied for 10 seconds to an end portion of the wire to which the terminal fitting was not connected. The air pressure was then raised to 200 kPa and applied for 10 seconds.

During the application of air pressure, the interface between the wire covering material and the resin covering portion was visually inspected for air bubbles. If air bubbles formed, it was determined that air had leaked. If no air bubbles formed, it was determined that no air had leaked. If no air leaked under the application of the air pressure of 200 kPa, it was rated as A, which signifies excellent anticorrosion performance. If air leaked under the application of the air pressure of 200 kPa but no air leaked under the application of the air pressure of 50 kPa, it was rated as B, which signifies satisfactory anticorrosion performance. If air leaked under the application of the air pressure of 50 kPa, it was rated as C, which signifies poor anticorrosion performance.

Test Results

See Tables 1 and 2 for the results of the anticorrosion performance testing together with the plasticizer content of the wire covering material (a), the plasticizer content of the resin covering portion (b), the plasticizer ratio (b/a), and the degree of polymerization of the PVC for Examples 1 to 6 and Comparative examples 1 to 6. The plasticizer content of the wire covering material is per 100 parts by mass of the high-molecular-weight component of the wire covering material. The plasticizer content of the resin covering portion is per 100 parts by mass of the high-molecular-weight component of the resin covering portion. 0 indicates that no plasticizer was added.

TABLE 1

|  |  | Examples | | | | | |
| --- | --- | --- | --- | --- | --- | --- | --- |
|  |  | 1 | 2 | 3 | 4 | 5 | 6 |
| Plasticizer content [parts by mass] | Wire covering material (a) | 20 | 40 | 20 | 40 | 40 | 40 |
|  | Resin covering portion (b) | 10 | 20 | 5 | 10 | 8 | 4 |
| Plasticizer ratio (b/a) |  | 0.50 | 0.50 | 0.25 | 0.25 | 0.20 | 0.10 |
| Degree of polymerization of PVC in wire covering material |  | 1500 | 3000 | 1500 | 1500 | 1500 | 3000 |
| Anticorrosion performance (after exposure to 120° C.) | 30 hours | A | A | A | A | A | A |
|  | 60 hours | A | A | A | A | A | A |
|  | 120 hours | A | A | B | A | B | B |

TABLE 2

|  |  | Comparative examples | | | | | |
| --- | --- | --- | --- | --- | --- | --- | --- |
|  |  | 1 | 2 | 3 | 4 | 5 | 6 |
| Plasticizer content [parts by mass] | Wire covering material (a) | 40 | 20 | 40 | 40 | 40 | 40 |
|  | Resin covering portion (b) | 2 | 0 | 0 | 0 | 0 | 0 |
| Plasticizer ratio (b/a) |  | 0.05 | 0 | 0 | 0 | 0 | 0 |
| Degree of polymerization of PVC in wire covering material |  | 3000 | 1500 | 1500 | 2000 | 2300 | 3000 |
| Anticorrosion performance (after exposure to 120° C.) | 30 hours | A | A | A | C | C | C |
|  | 60 hours | C | B | B | C | C | C |
|  | 120 hours | C | C | C | C | C | C |

As indicated in Tables 1 and 2, high anticorrosion performance was maintained after the exposure to the high temperature for 120 hours in Examples 1 to 6, in which the plasticizer ratio was greater than or equal to 0.1 and the degree of polymerization of the PVC in the wire covering material was smaller than or equal to 3000. These test results are attributable to the following: the amount of plasticizer added to the resin covering portion was sufficient to satisfy the plasticizer ratio, and thus the migration of the plasticizer from the wire covering material to the resin covering portion was inhibited. Additionally, the degree of polymerization of the PVC in the wire covering material was low, and the enhanced flexibility of the wire covering material can be maintained even if migration or volatilization of the plasticizer occurs. Thus, the formation of a crack in the wire covering material due to the migration of the plasticizer was inhibited.

Comparison of the test results of the examples within groups having the same degree of polymerization of the PVC in the wire covering material (i.e., a group of Examples 1, 3 to 5 and a group of Examples 2 and 6) indicates a tendency of those having higher plasticizer ratios to exhibit better anticorrosion performance. In particular, compare Example 1 with Example 3, Example 4 with Example 5, and Example 2 with Example 6. In each pair, the plasticizer content of the wire covering material and the degree of polymerization of the PVC are the same but the plasticizer ratio is different because of a different plasticizer content of the resin covering portion. These comparisons show that Examples 1, 2, and 4, which have the higher plasticizer ratios, exhibited better anticorrosion performance than did Examples 3, 5, and 6, which have the lower plasticizer ratios, after high-temperature exposure for 120 hours. This indicates that a reduction in the anticorrosion performance due to the migration of a plasticizer can be better inhibited with a higher plasticizer ratio.

Compare also Example 3 with Example 4. In this pair, the plasticizer ratio and the degree of polymerization of the PVC in the wire covering material are the same but the plasticizer content of the wire covering material and that of the resin covering portion are different. This comparison shows that Example 4, which has the greater plasticizer content in the wire covering material and the greater plasticizer content in the resin covering portion, exhibited better anticorrosion performance after exposure to a high temperature for 120 hours. This is attributable to the following: where the plasticizer ratio is the same, a wire covering material with a greater plasticizer content is more likely than a covering material with a smaller plasticizer content to contain a greater amount of retained plasticizer, and thus its flexibility can be ensured after high-temperature exposure.

In contrast, the plasticizer ratios in the comparative examples are less than 0.1. The comparative examples exhibited reduced anticorrosion performance after at least 120 hours of high-temperature exposure and failed to maintain required anticorrosion performance. This can be explained by the following: when the resin covering portion contains no plasticizer or when the plasticizer content of the resin covering portion is not sufficient to satisfy the plasticizer ratio, the plasticizer is likely to migrate from the wire covering material to the resin covering portion, causing a crack in the wire covering material after high-temperature exposure.

Comparative examples 3 to 6 have different degrees of polymerization of the PVC in the wire covering material. The resin covering portion in these comparative examples contains no plasticizer, thus sufficient anticorrosion performance was not obtained after at least 120 hours of the high-temperature exposure. Note, however, that Comparative example 3, which has a lower degree of polymerization of the PVC in the wire covering material, exhibited satisfactory anticorrosion performance up to 60 hours of high-temperature exposure. This is presumably because the flexibility of the wire covering material was maintained due to the low degree of polymerization of the PVC despite the migration of the plasticizer to the resin covering portion, and thus a crack in the wire covering material was prevented.

While some embodiments of the present disclosure have been described above in detail, the present disclosure is not limited to the embodiments described above and can be modified in various ways without departing from the spirit of the present disclosure.

The terminal-equipped wire according to the embodiments described above uses a plasticizer ratio greater than or equal to 0.1 and a degree of polymerization of PVC that is the principal component of the wire covering material smaller than or equal to 3000, and thus inhibits the formation of a crack in the wire covering material due to the migration of the plasticizer from the wire covering material to the resin covering portion, achieving excellent anticorrosion performance. If a reduced level of anticorrosion performance is required when, for example, the operating temperature of the terminal-equipped wire is relatively low, the terminal-equipped wire may use one of a plasticizer ratio greater than or equal to 0.1 and a degree of polymerization of PVC that is the principal component of the wire covering material smaller than or equal to 3000, and thus inhibit the formation of a crack in the wire covering material due to the migration of the plasticizer from the wire covering material to the resin covering portion, achieving the required anticorrosion performance. Furthermore, if the principal component of the wire covering material is a high-molecular-weight material other than PVC, the terminal-equipped wire including the wire covering material may use a plasticizer ratio greater than or equal to 0.1 and/or a degree of polymerization of the high-molecular-weight material smaller than or equal to a predefined upper limit value, and thus can inhibit the formation of a crack in the wire covering material due to the migration of the plasticizer from the wire covering material to the resin covering portion.

What is claimed is:

1. A terminal-equipped wire comprising:
   a terminal fitting;
   a wire including a conductor and a wire covering that covers an outer circumference of the conductor, the wire being electrically connected to the terminal fitting at an electric connection; and
   a resin covering that covers the electric connection and is in contact with the wire covering, wherein:
   the wire covering contains polyvinyl chloride and a plasticizer, the polyvinyl chloride being a principal component of the wire covering and having a degree of polymerization smaller than or equal to 3000,
   the resin covering contains a high-molecular-weight component and a plasticizer, with the proviso that the resin covering does not include a polyamide resin, and
   a plasticizer ratio defined as b/a in which a content of the plasticizer of the wire covering is defined as "a" parts by mass per 100 parts by mass of the high-molecular-weight component of the wire covering, and a content of the plasticizer of the resin covering is defined as "b" parts by mass per 100 parts by mass of the high-molecular-weight component of the resin covering, is greater than or equal to 0.1.

2. The terminal-equipped wire according to claim 1, wherein the resin covering contains a thermoplastic elastomer as the high-molecular-weight component.

3. The terminal-equipped wire according to claim 1, wherein the plasticizer ratio is greater than or equal to 0.25.

4. The terminal-equipped wire according to claim 1, wherein the degree of polymerization of the polyvinyl chloride is equal to or smaller 2000.

5. The terminal-equipped wire according to claim 1, wherein fusion bonding occurs at an interface between the wire covering and the resin covering.

6. A wire harness comprising the terminal-equipped wire according to claim 1.

* * * * *